(12) United States Patent
Osterhoff (10) Patent No.: US 10,793,027 B2
(45) Date of Patent: Oct. 6, 2020

(54) LOCKING CAM COMPONENT FASTENING DEVICE

(71) Applicant: FORD GLOBAL TECHNOLOGIES, LLC, Dearborn, MI (US)

(72) Inventor: Daniel Jay Osterhoff, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 820 days.

(21) Appl. No.: 15/591,603

(22) Filed: May 10, 2017

(65) Prior Publication Data
US 2018/0326872 A1    Nov. 15, 2018

(51) Int. Cl.
  *B60N 2/02*    (2006.01)
  *B60N 2/07*    (2006.01)
(52) U.S. Cl.
  CPC .............. *B60N 2/0732* (2013.01); *B60N 2/02* (2013.01)
(58) Field of Classification Search
  CPC ...... F16B 21/00; F16B 21/086; F16B 21/075; F16B 19/1081; F16B 5/06; F16B 5/065; F16B 5/0642; B60R 13/02; B60R 13/0206; B60N 3/02; B60N 3/023; B60N 3/026; B60N 2/02; B60N 2/0732
  See application file for complete search history.

(56) References Cited

U.S. PATENT DOCUMENTS

| 4,067,090 A * | 1/1978 | Schenk | F16B 21/04 411/554 |
| 4,076,437 A * | 2/1978 | Mazzolla | F16B 7/1427 248/411 |
| 5,482,417 A * | 1/1996 | Erickson | B23B 31/107 411/306 |
| 7,037,027 B2 * | 5/2006 | Steinbeck | F16B 5/025 403/296 |
| 2013/0322957 A1 * | 12/2013 | Conrad | F16L 27/12 403/109.5 |

* cited by examiner

*Primary Examiner* — Daniel J Wiley
(74) *Attorney, Agent, or Firm* — David Coppiellie; Price Heneveld LLP (57) ABSTRACT

A fastening device comprising a cam lock is received within a first orifice of a first component and a threaded fastener extending through a central axial cavity provided in the cam lock is received within a second orifice of a second component. A cam surface on the cam lock induces a clamping load between the first and the second components normal to the axial cavity when rotated from a first to a second rotational position.

19 Claims, 7 Drawing Sheets

LOCKING CAM COMPONENT FASTENING DEVICE

FIELD OF THE INVENTION

The present invention generally relates to a fastening device that provides a mating part clamp force that is normal to the axis of the fastener, more particularly, a component fastening device having a cam lock within which a fastener extends to apply a clamp load at an interface between two or more operably coupled components.

BACKGROUND OF THE INVENTION

Modern motor vehicle seating assemblies are becoming more and more comfortable as designers improve their understanding of human ergonomics, posture, and comfortability. Vehicle seating assemblies now include comfort components in the motor vehicle seating assembly that can provide the driver and passengers with improved comfort and increased endurance for extensive vehicle rides. However, various sizes and shapes of drivers and passengers can prove challenging when providing motor vehicle seating assemblies. Accordingly, aesthetically attractive motor vehicle seating assemblies that include components optimized to accommodate the different sizes and shapes of drivers and passengers, as well as the desired posture and sitting positions of those drivers and passengers, has become increasingly important.

As a consequence, contemporary motor vehicle seating assemblies now incorporate hundreds of discrete parts. The assembly of such contemporary motor vehicle seating assemblies requires bringing together these hundreds of parts to be assembled into a final motor vehicle seating assembly, typically employing so-called "Kanban" or "Just-In-Time" ("JIT") assembly processes to achieve the completed motor vehicle seat assembly. Using such assembly processes, it has been found to be advantageous to modularize the motor vehicle seating assembly into discrete subassemblies in order to reduce the costs of final assembly. This allows the subassemblies to be sourced from a location independent of the final JIT assembly plant. An improved motor vehicle seating assembly module design to achieve all of the needs of the motor vehicle seating assembly, particularly a design that positively and conveniently couples a one-piece lower seat cushion and lower seat pan to the seat track assembly, was desired.

SUMMARY OF THE INVENTION

According to one aspect of the present disclosure, a fastening device comprising a cam lock is received within a first orifice of a first component and a threaded fastener extending through a central axial cavity provided in the cam lock and received within a second orifice of a second component. The cam lock induces a clamping load between the first and the second components normal to the axial cavity when rotated from a first to a second rotational position.

Embodiments of the first aspect of the disclosure can include any one or a combination of the following features:

- A cam lock comprising a barrel portion having an interior diameter and an exterior diameter through which the central axial cavity extends, a distal end, and a proximal end, the proximal end comprising a cam surface proximate the exterior diameter of the barrel portion of the cam lock that engages an interior diameter of the first orifice of the first component and displaces the first component downwardly relative the second component when the cam lock is rotated from the first to the second rotational position;
- the first and second components are separated by a gap prior to assembly of the fastening device and wherein the first and second components are brought into abutting and clamped relation one with the other subsequent assembly of the fastening device and rotation of the cam lock from the first to the second rotational position;
- the displacement of the first component downwardly when the cam lock is rotated from the first to the second rotational position equals or exceeds the gap prior to assembly of the fastening device;
- the threaded fastener includes a threaded portion and a shoulder portion and the proximal end of the cam lock further comprises a substantially hexagonal drive head by which the cam lock can be rotated from the first to the second rotational position relative the threaded fastener when the shoulder portion of the threaded fastener is in abutting relation with the second component;
- the first orifice comprises a key slot radially disposed along a lower portion of an interior diameter of the first orifice and the distal end of the cam lock comprises a key tab disposed outside and extending radially from a portion of an exterior diameter of the distal end which is received within the key slot during assembly of the fastening device;
- the cam surface comprises a resilient locking tab disposed 180° opposite the key tab at a terminal portion of the cam surface, wherein the locking tab is displaced radially inwardly when the cam lock is rotated from the first to the second rotational position and the locking tab is urged into the key slot when the cam lock is in the second rotational position to thereby lock the locking tab in the second rotational position when the fastening device is assembled;
- the cam surface and locking tab extend axially toward the distal end of the cam lock beyond an inward surface of the drive head of the cam lock that abuts an outer surface of the first component when the fastening device is assembled;
- the proximal end of the cam lock includes a recess proximate the outer diameter of the drive head of the cam lock within which the locking key is disposed and within which the locking key of the cam lock can be displaced;
- the cam lock is comprised of a resilient material, whereby removal of the threaded fastener from the cam lock allows the cam lock to be removed from the first orifice of the first component to allow disassembly of the fastening device
- the cam lock is comprised of a polymeric material;
- the fastener includes a threaded portion, a shoulder portion, and a drive head portion, and the cam lock further comprises a drive surface at a proximal end thereof by which the cam lock can be rotated from the first to the second rotational position relative the threaded fastener when the shoulder portion of the fastener is tightened against the second component;
- the drive head portion of the threaded fastener comprises an internal drive and the drive surface of the distal end of the cam lock comprises a substantially hexagonal prism;

the threaded fastener comprises a circular outer diameter drive head portion and a proximal end of the cam lock comprises a circular recess within which is fittingly received the drive head portion of the threaded fastener, whereby the cam lock may be rotated relative the threaded fastener; and the fastening device is installed on a modular composite seating assembly, the modular composite seating assembly comprising a pair of opposed seat track assemblies and a lower seat assembly having a seat pan, the seat pan having a pair of opposed side members, a one of each of the pair of opposed side members of the seat pan being in juxtaposed relation with a corresponding one of the pair of opposed seat track assemblies, wherein the one of the pair of opposed side members of the seat pan comprises the first component and the one of the pair of opposed seat track assemblies comprises the second component.

According to a another aspect of the present disclosure, a fastening device induces a clamping load between a first component and a second component, the first component having a first face opposed to and proximate a second face of the second component. The fastening device comprising a cam lock having a first rotational position and a second rotational position received within a first orifice in the first component, the cam lock comprising a cam surface and a locking tab at a terminal portion of the cam surface that engages an interior diameter of the first orifice of the first component and displaces the first component downwardly when the cam lock is rotated from the first to the second rotational position. A threaded fastener is received within a threaded second orifice in the second component, and extends through a central axial cavity provided in the cam lock. The cam lock induces a clamping load between the first face of the first component and the second face of the second component in a direction normal to the axial cavity of the cam lock and the locking tab is urged into a key slot disposed within the inner diameter of the first orifice when the cam lock is in the second rotational position.

According to a further aspect of the present disclosure, a modular composite seating assembly comprises a seat track assembly, a lower seat assembly having a lower seat pan, the lower seat pan having a side member, and wherein the side member of the lower seat pan is in juxtaposed relation with the seat track assembly, and a fastening device for inducing a clamping load between the seat track assembly and the lower seat pan. The fastening device comprises a cam lock having a first rotational position and a second rotational position received within a first orifice in the side member of the lower seat pan, the cam lock comprising a cam surface that engages an interior diameter of the first orifice of the side member of the lower seat pan and displaces the side member of the lower seat pan downwardly relative the seat track assembly when the cam lock is rotated from the first to the second rotational position, and a threaded fastener received within a threaded second orifice in the seat track assembly, and extending through a central axial cavity provided in the cam lock, wherein the cam lock induces a clamping load between the side member of the lower seat pan and the seat track assembly in a direction normal to the central axial cavity of the cam lock when the cam lock is in the second rotational position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
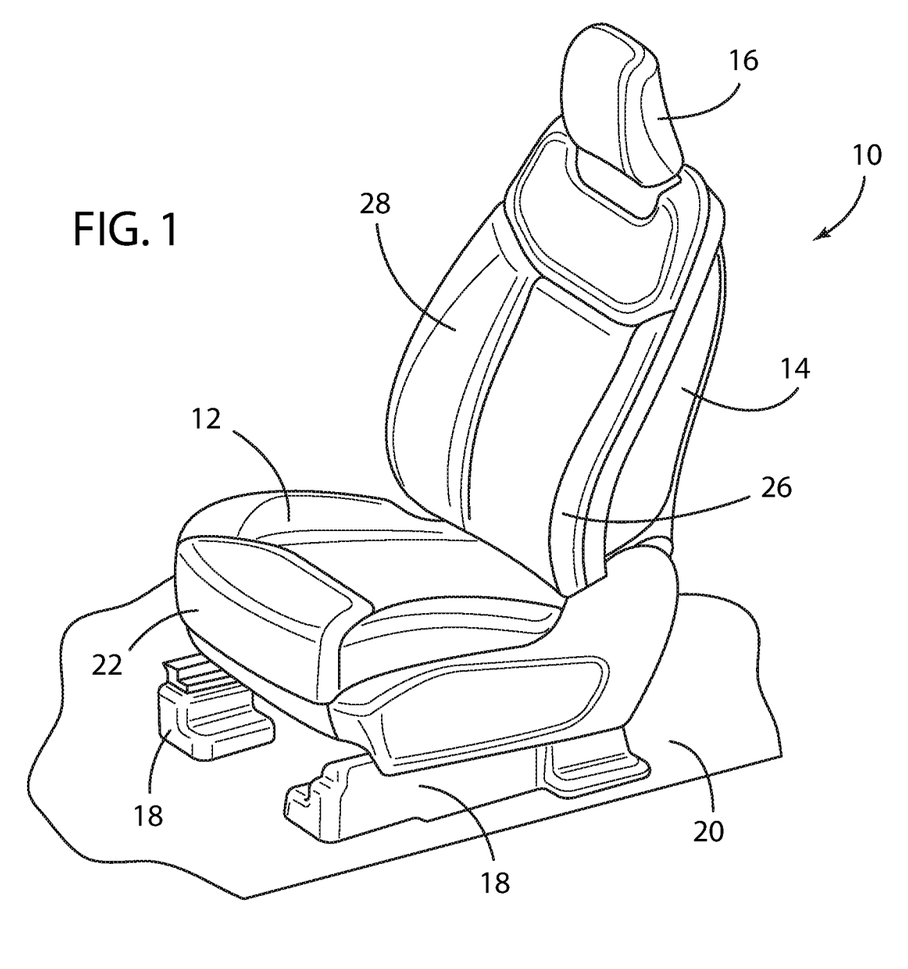
FIG. 1 is a front side perspective view of a modular motor vehicle seating assembly, wherein the lower seat assembly is assembled in accordance with the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
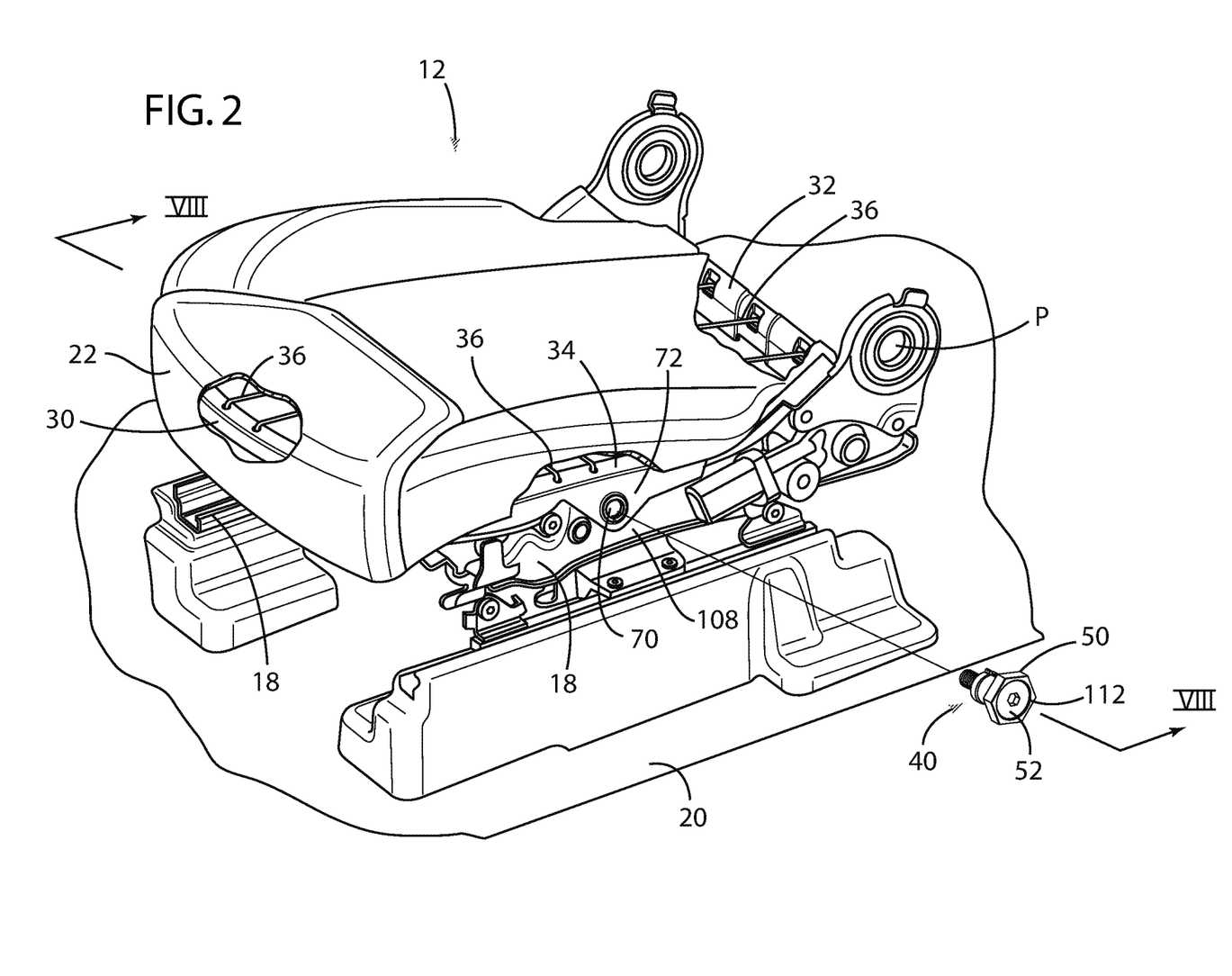
FIG. 2 is a front side perspective view of the lower seat assembly of the motor vehicle seating assembly of FIG. 1, wherein the lower seat assembly is assembled in accordance with the present disclosure.
Figure 3:
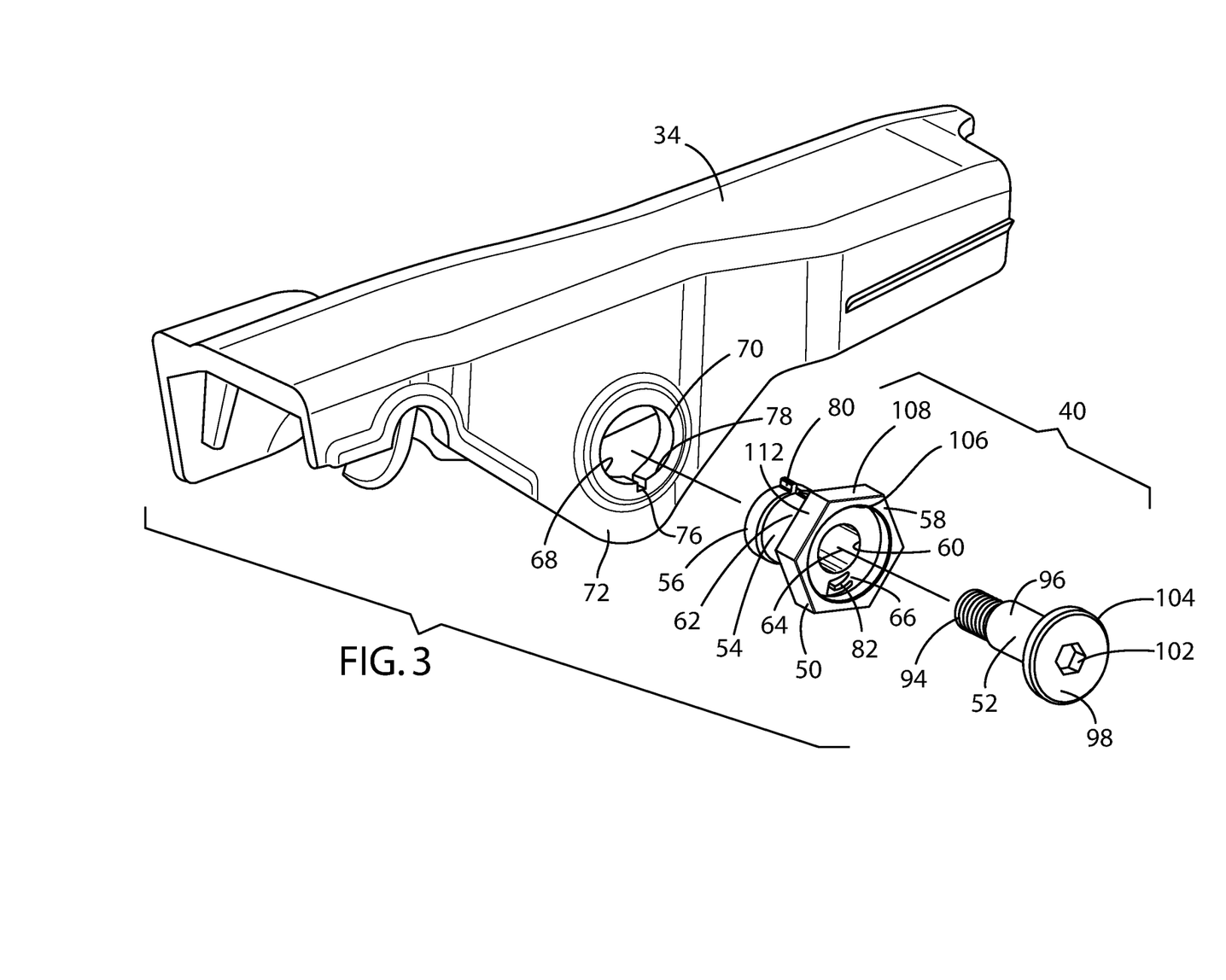
FIG. 3 is a front side perspective view of a portion of a side member of the lower seat pan of the lower seat assembly of the motor vehicle seating assembly of FIG. 1, displaying the fastening device in accordance with the present disclosure.
Figure 4:
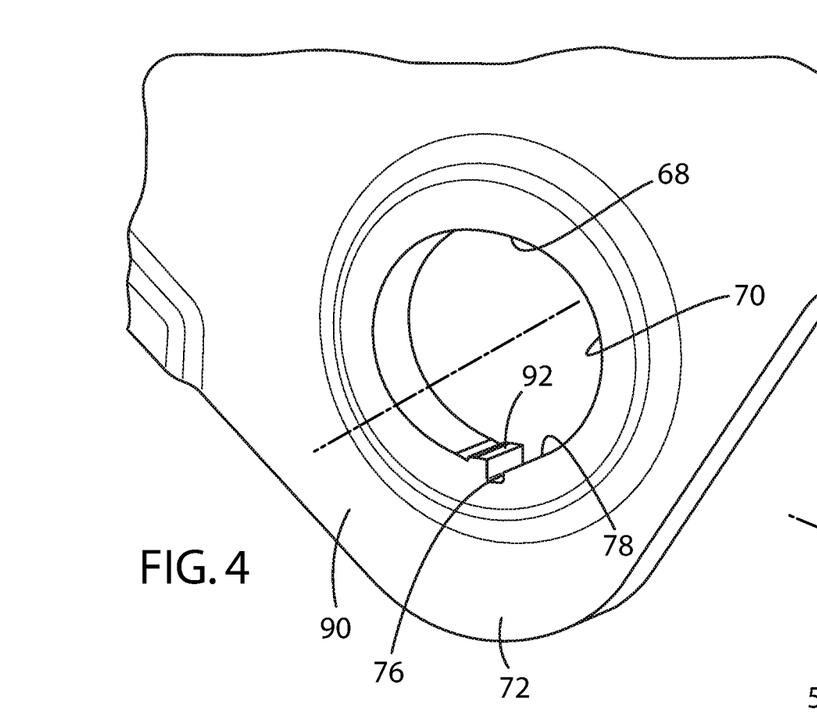
FIG. 4 is an enlarged front side perspective view of the portion of a side member of the lower seat pan of the lower seat assembly of the motor vehicle seating assembly of FIG. 3, displaying the first orifice of the fastening device in accordance with the present disclosure.
Figure 5:
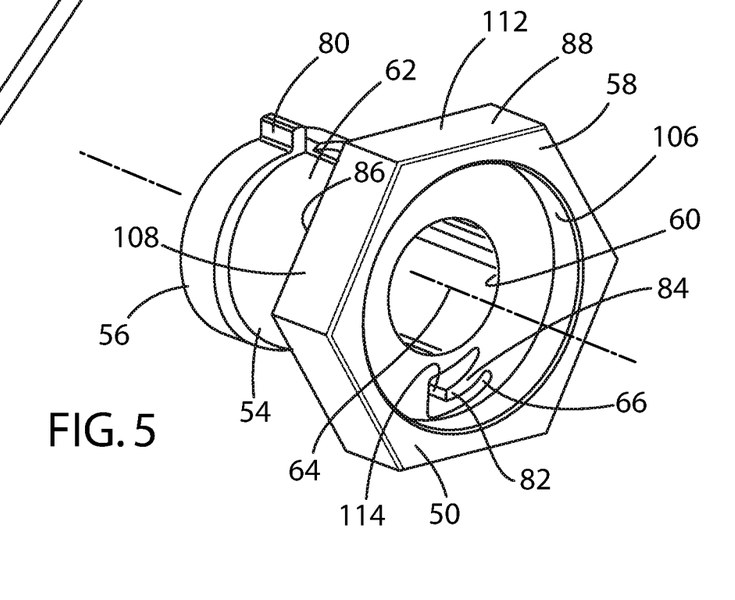
FIG. 5 is an enlarged rear side perspective view of the cam lock of the fastening device in accordance with the present disclosure.
Figure 6:
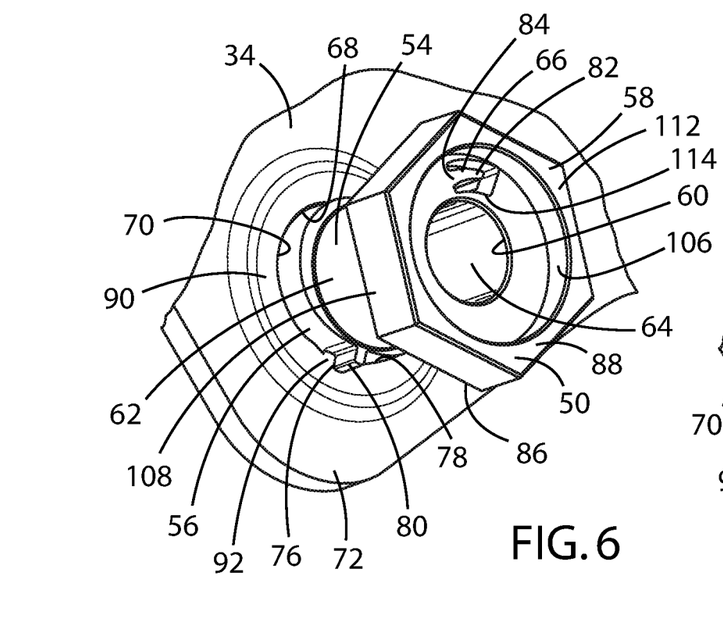
FIG. 6 is an enlarged front side perspective view of the portion of the side member of the lower seat pan of the lower seat assembly of the motor vehicle seating assembly of FIG. 3, displaying the first orifice into which is inserted the cam lock of the fastening device in the first rotational position, without the threaded fastener installed, in accordance with the present disclosure.
Figure 7:
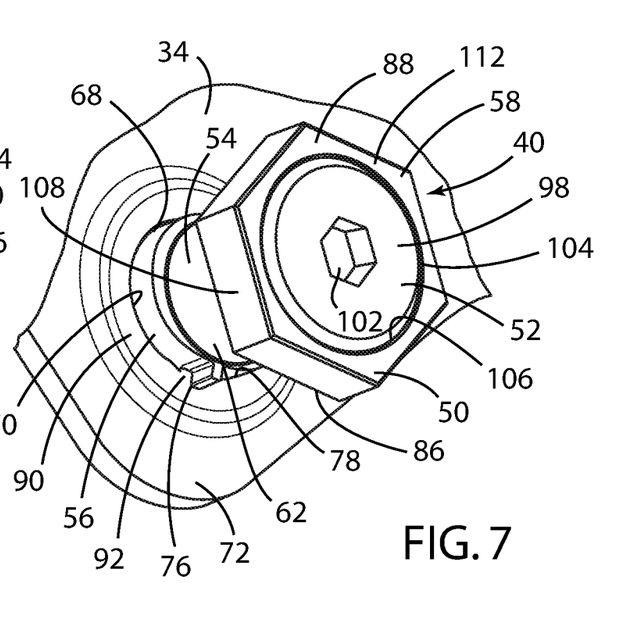
FIG. 7 is an enlarged front side perspective view of the portion of the side member of the lower seat pan of the lower seat assembly of the motor vehicle seating assembly of FIG. 3, displaying the first orifice into which is inserted the cam lock of the fastening device in the first rotational position, with the threaded fastener installed, in accordance with the present disclosure.

Referring to FIGS. 1 and 2, reference numeral 10 generally designates a motor vehicle seating assembly for a motor vehicle (not shown). As is typical, the motor vehicle seating assembly 10 has a lower seat assembly 12 and an upwardly extending seatback assembly 14. The seatback assembly 14 preferably supports a headrest 16 thereon. The motor vehicle seating assembly 10 is supported on either side by a pair of identical seat track assemblies 18 that are each in turn fixedly attached to a floorboard 20 of the motor vehicle. As is known, the fore and aft position of the motor vehicle seating assembly 10 can be adjusted along the longitudinal length of the seat track assembly 18 at various detached positions.

As shown in FIG. 2, the lower seat assembly 12 comprises a lower seat cushion 22 and a lower seat pan 24 upon which the lower seat cushion 22 is supported. The lower seat cushion 22 is preferably formed from a foamed polymer, and the lower seat pan 24 is preferably configured from a substantially rigid material, such as aluminum, steel, or a polymeric material. More preferably, the lower seat pan 24 is fabricated from a polymeric material, such as rigid polyvinylchloride. The lower seat assembly 12 may include a pivot P to which the upwardly extending seatback assembly 14 may be pivotably attached to the motor vehicle seating assembly 10 at a lower portion 26 thereof. In particular, the seatback assembly 14 comprises a pivotable cushion 28, also formed from a foam polymer, wherein the seatback assembly 14 may be pivoted between a deployed position, in which the seatback assembly 14 is in an upright deployed condition so as to support a motor vehicle occupant, and a stowed position, in which the seatback assembly 14 is pivoted forward about a lower portion 26 of the seatback assembly 14.

The motor vehicle seating assembly 10 of the present disclosure is preferably a modular composite seating assembly. In particular, the lower seat assembly 12 of the motor vehicle seating assembly 10 is preferably comprised of individual modular assemblies that may be selectively employed in any given motor vehicle seating assembly 10. These modular assemblies include the seat track assembly 18, the lower seat pan 24, which conforms to the outer perimeter of the lower seat assembly 12 and has at least fore, aft, and opposed side members 30, 32, 34, respectively, to which the suspension system 36 of the lower seat assembly 12 may be attached, and the lower seat cushion 22. By virtue of the modular assembly, any given motor vehicle seating assembly 10 can be assembled with, for example, a manual or powered seat track assembly 18, a lower seat pan 24 having a fixed firmness or adjustable firmness suspension system 36, a cloth- or leather-finished lower seat cushion 22, or any mixture thereof.

In order to accomplish the desired modularity of assembly, the lower seat pan 24, to which the lower seat cushion 22 has been previously attached, is preferably secured to the seat track assemblies 18 via a relatively quick and easily installed device in order to reduce cost, time, and complexity. Preferably, each of the opposed side members 34 of the lower seat pan 24 is attached to one of the pair of seat track assemblies 18 via a fastening device 40 herein disclosed, which uniquely allows for the proper clamp load between the lower seat pan 24 and the seat track assembly 18 in the vertical direction without regard to tolerance variations, which, in the past, has led to frame looseness, which has, in turn, resulted in excessive movement, noise, and overall customer dissatisfaction.

That is, the lower seat pan 24 has a first face 42 opposed to and proximate a second face 44 of the seat track assembly 18 upon which the lower seat pan 24 is preferably supported after the lower seating assembly 12 is assembled. However, prior to such assembly, the first and second faces 42, 44 of the lower seat pan 24 and the seat track assembly 18, respectively, are separated by a gap G. It is desirable that the first face 42 and the second face 44 be brought into juxtaposed or abutting and clamped relation one with the other subsequent assembly of the fastening device 40 and rotation of a cam lock 50 from a first rotational position to a second rotational position when assembled in order to prevent the aforementioned frame looseness.

This may be achieved through the displacement downwardly of the side member 34 of the lower seat pan 24 relative the seat track assembly 18 when the cam lock 50 is rotated from the first rotational position to the second rotational position by a distance that equals or exceeds the gap G prior to assembly of the fastening device 40. In accordance with the present disclosure, the fastening device 40 allows for vertical tightening using a horizontal attachment. The fastening device 40 employs the plastic cam lock 50 that rotates 180° once a threaded fastener 52, preferably a shoulder bolt, is attached to vertically displace the lower seat pan 24 and urge it against the seat track assembly 18. The fastening device 40 thus induces a clamping load between the lower seat pan 24 and the seat track assembly 18.

The fastening device 40 broadly comprises the cam lock 50 and a threaded fastener 52. The cam lock 50 has a central barrel portion 54, a distal end 56, and a proximal end 58. The central barrel portion 54 has an interior diameter 60 and an exterior diameter 62 and defines a central axial cavity 64 that extends through the length of the cam lock 50. The proximal end 58 includes a cam surface 66 on the exterior diameter 62 of the central barrel portion 54 of the cam lock 50 that engages an interior diameter 68 of a circular opening or first orifice 70, preferably disposed on a vertically depending flange 72 provided approximately mid-length on each of the pair of opposed side members 34 of the lower seat pan 24. The cam surface 66 of the cam lock 50 engages the interior diameter 68 of the first orifice 70 of the lower seat pan 24 and displaces the side member 34 of the lower seat pan 24 downwardly relative to the seat track assembly 18 when the cam lock 50 is rotated from the first rotational position to the second rotational position, as shown in FIGS. 10 and 11, and as further described below.

Figure 10:
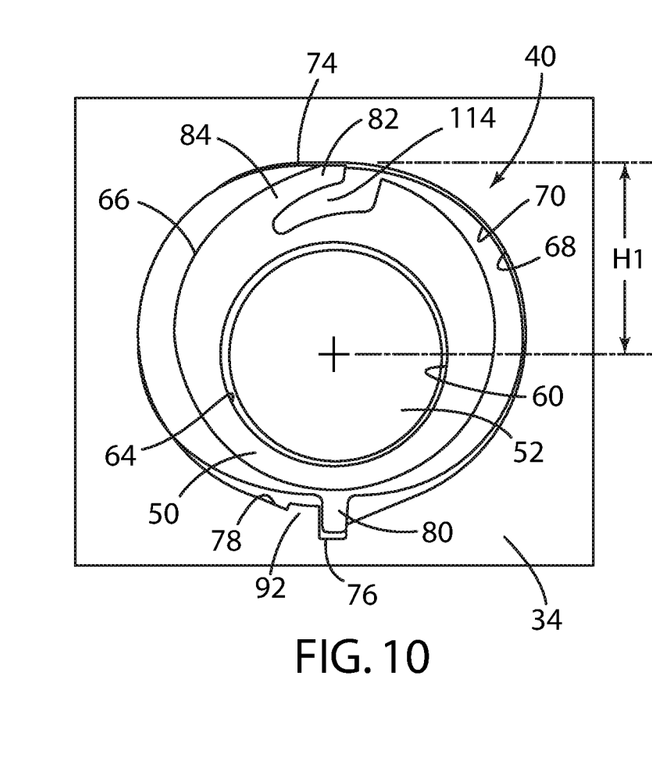
FIG. 10 is a cross-sectional view normal to the axis of the fastening device in accordance with the present disclosure, displaying the cam lock of the fastening device in the first rotational position.
Figure 11:
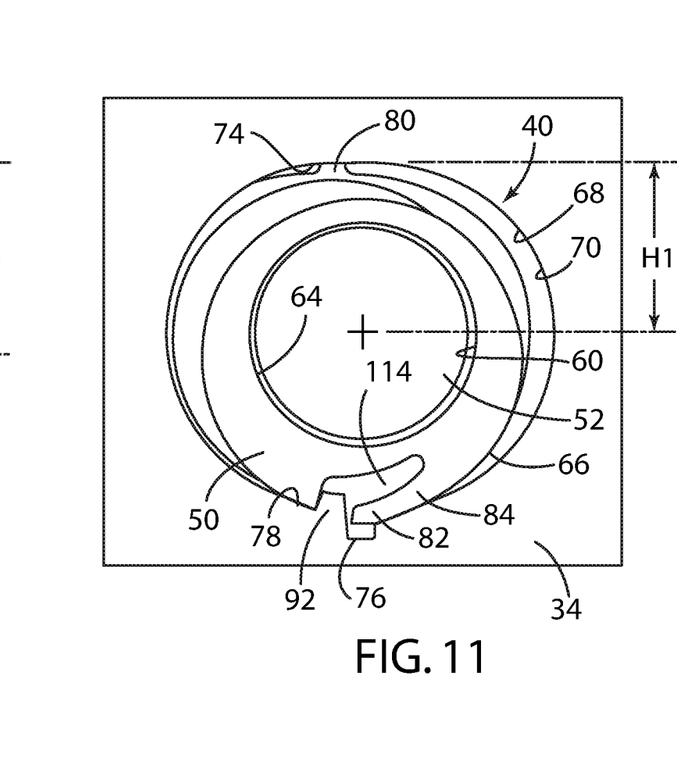
FIG. 11 is a cross-sectional view normal to the axis of the fastening device in accordance with the present disclosure, displaying the cam lock of the fastening device in the second rotational position.

In particular, as shown in the FIG. 10, in the first rotational position, the distance between the centerline of the central axial cavity 64 of the cam lock 50 and an upper edge 74 of the interior diameter 68 of the first orifice 70 of the side member 34 of the lower seat pan 24 can be defined by a distance $H_1$. However, in the second rotational position, the distance between the centerline of the central axial cavity 64 of the cam lock 50 and the upper edge 74 of the interior diameter 68 of the first orifice 70 of the side member 34 of the lower seat pan 24 can be defined by a distance $H_2$, where H₂ is less than H₁. Preferably, the distance (H₁−H₂) equals or exceeds the gap G prior to assembly of the fastening device 40.

Preferably, the first orifice 70 includes a radial key slot 76 disposed along a lower edge 78 of the interior diameter 68 of the first orifice 70, and the distal end 56 of the cam lock 50 comprises a key tab 80 disposed outside and extending radially from the exterior diameter 62 of the distal end 56 which is received within the key slot 76 during assembly of the fastening device 40. The use of the key slot 76 and key tab 80 allows for proper alignment of the cam lock 50 during the assembly process, where the cam lock 50 is inserted into the first orifice 70 in the first rotational position, shown in FIG. 8, which is 180° from the second rotational position, shown in FIG. 9.

In addition, the cam lock 50 also includes a locking tab 82 at a terminal portion 84 of the cam surface 66 that likewise engages the interior diameter 68 of the first orifice 70 of the lower seat pan 24 and locks the cam lock 50 in the second rotational position. To accomplish this result, the cam surface 66 may include a resilient locking tab 82 disposed 180° opposite the key tab 80 at the terminal portion 84 of the cam surface 66, where the locking tab 82 is displaced radially inwardly when the cam lock 50 is rotated from the first rotational position to the second rotational position, as shown in FIG. 10, and the locking tab 82 is then urged into the key slot 76 when the cam lock 50 is in the second rotational position, as shown in FIG. 11, to thereby lock the cam lock 50 in the second rotational position when the fastening device 40 is assembled. The lower edge 78 of the interior diameter 68 of the first orifice 70 also may include a raised ramp portion 92 adjacent the key slot 76 to further provide a positive locking engagement.

Figure 8:
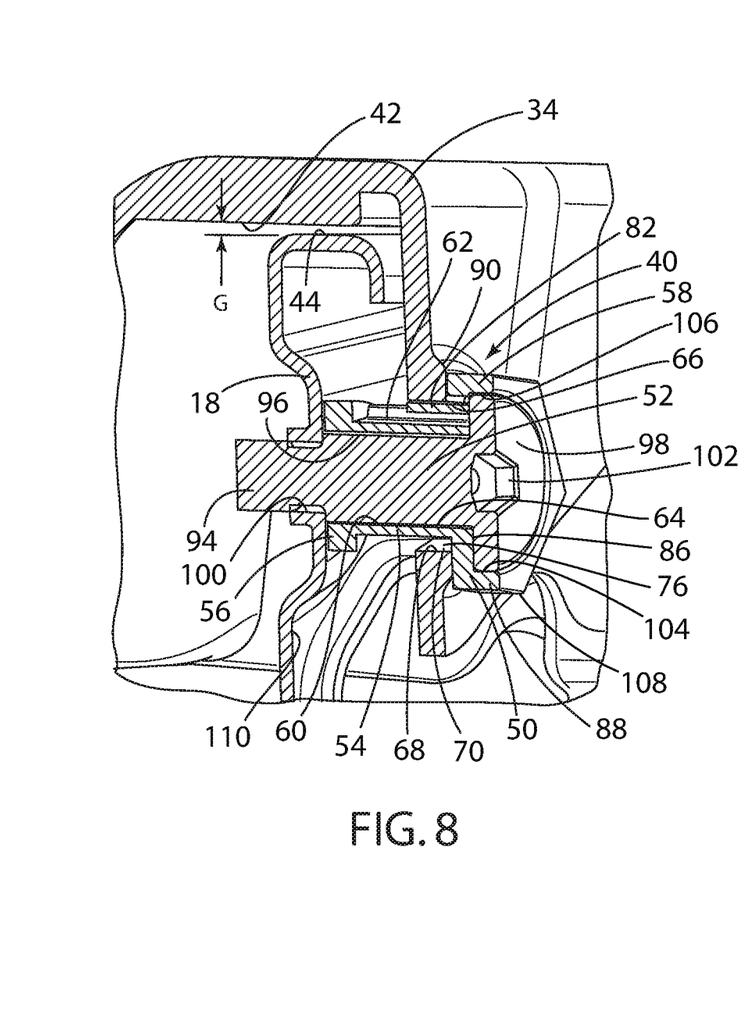
FIG. 8 is a cross-sectional perspective view of the side member of the lower seat pan and seat track assembly of the lower seat assembly of the motor vehicle seating assembly of FIG. 2 taken along the line VIII-VIII, displaying the cam lock of the fastening device in the first rotational position, in accordance with the present disclosure.
Figure 9:
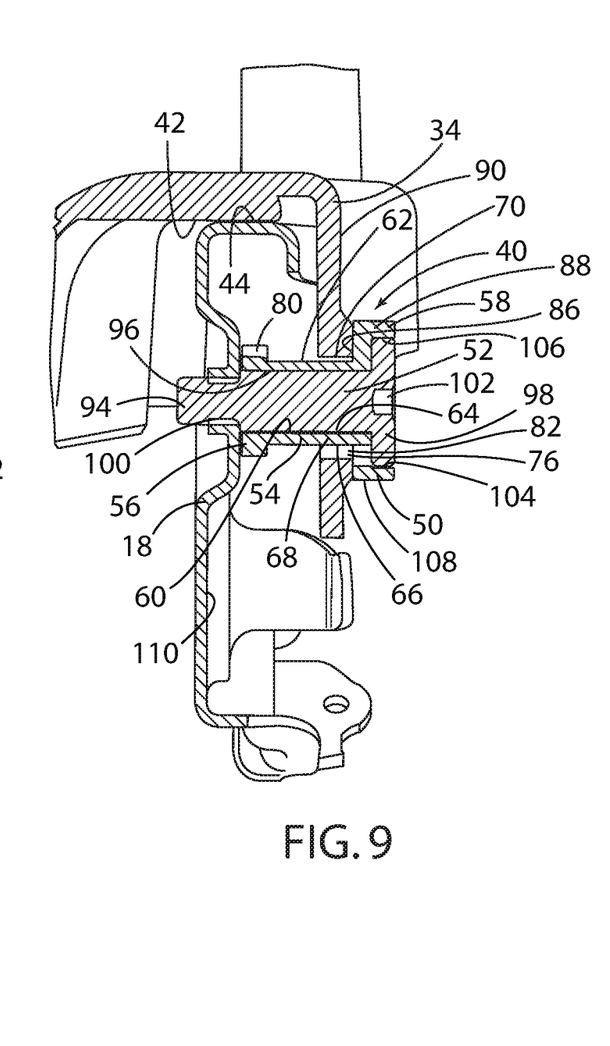
FIG. 9 is a cross-sectional perspective view of the side member of the lower seat pan and seat track assembly of the lower seat assembly of the motor vehicle seating assembly of FIG. 2 taking along the line VIII-VIII, displaying the cam lock of the fastening device in the second rotational position, in accordance with the present disclosure.

As shown in FIGS. 8 and 9, the cam surface 66 and locking tab 82 may extend axially toward the distal end 56 of the cam lock 50 beyond an inward surface 86 of a drive head 88 of the cam lock 50 that abuts an outer surface 90 of the side member 34 of the lower seat pan 24 when the fastening device 40 is assembled so as to engage the interior diameter 68 of the first orifice 70 as described above.

The threaded fastener 52 may include a threaded portion 94, a shoulder portion 96, and a drive head portion 98. The threaded portion 94 of the threaded fastener 52 is preferably received within a threaded second orifice 100 in the seat track assembly 18. Preferably, the threaded fastener 52 is inserted through the central axial cavity 64 of the cam lock 50 prior to the cam lock 50 being inserted through the first orifice 70, as described above. Thereby, the cam lock 50 and the threaded fastener 52 can be inserted through the first orifice 70 as an assembly. The drive head portion 98 of the threaded fastener 52 may include an internal drive 102, such as a Torx drive. As shown in FIGS. 5-9, the drive head portion 98 of the threaded fastener 52 may have a circular outer diameter 104, and the proximal end 58 of the cam lock 50 may include a circular recess 106 within which is fittingly received the drive head portion 98 of the threaded fastener 52, whereby the cam lock 50 may be rotated relative the threaded fastener 52.

The cam lock 50 further may include a drive surface 108 at the proximal end 58 thereof by which the cam lock 50 can be rotated from the first rotational position to the second rotational position relative the threaded fastener 52 after the shoulder portion 96 of the threaded fastener 52 is tightened against an outer surface 110 of the seat track assembly 18. That is, once installed, the shoulder portion 96 of the threaded fastener 52 allows the cam lock 50 to nevertheless rotate freely relative the first orifice 70. Preferably, the drive surface 108 of the proximal end 58 of the cam lock 50 is formed as a substantially hexagonal prism 112 that can be driven like any standard hex head fastener.

With the cam lock 50 inserted within the first orifice 70, the threaded fastener 52 inserted through the central axial cavity 64 and the shoulder portion 96 of the threaded fastener 52 tightened against the outer surface 110 of the seat track assembly 18, counterclockwise rotation of the cam lock 50 180° relative the fixed threaded fastener 52, as shown in FIG. 10, causes the cam surface 66 to slide against the interior diameter 68 of the first orifice 70 of the side member 34 of the lower seat pan 24. Such rotation thus displaces the side member 34 of the lower seat pan 24 downwardly relative the seat track assembly 18 as the cam lock 50 is rotated from the first rotational position to the second rotational position. By displacing the side member 34 of the lower seat pan 24 downwardly, the cam lock 50 induces a clamping load between first face 42 of the side member 34 of the lower seat pan 24 and the second face 44 of the seat track assembly 18 in a direction normal to the central axial cavity 64 of the cam lock 50 when the cam lock 50 is in the second rotational position.

To maintain the cam lock 50 in the second rotational position, the locking tab 82 is urged into the key slot 76 disposed at the lower edge 78 of the interior diameter 68 of the first orifice 70 when the cam lock 50 is in the second rotational position. That is, once the cam lock 50 is rotated counterclockwise slightly more than 180° from the original position in which the cam lock 50 and threaded fastener 52 were inserted into the first orifice 70, the over travel of the locking tab 82 relative the raised ramp portion 92 and the key slot 76 causes the locking tab 82 to essentially snap into the key slot 76 in the second rotational position. Preferably, the proximal end 58 of the cam lock 50 includes a recess 114 proximate the exterior diameter 62 of the cam lock 50 within which the locking tab 82 is disposed and within which the locking tab 82 of the cam lock 50 can be displaced.

Preferably, the cam lock 50 is comprised of a resilient material, and even more preferably is comprised of a polymeric material. This especially facilitates disassembly of the fastening device 40 of the present disclosure. That is, upon removal of the threaded fastener 52 from the threaded second orifice 100, the resilient material of the cam lock 50 allows the cam lock 50 to be slightly deformed, the locking tab 82 withdrawn from the key slot 76, the cam lock 50 rotated clockwise to the first rotational position to remove the clamping load between the lower seat pan 24 and the seat track assembly 18, and the cam lock 50 removed from the first orifice 70 of the side member 34 of the lower seat pan 24 to allow disassembly of the fastening device 40 and disassembly of the lower seat cushion 22 from the seat track assembly 18.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components.

Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A fastening device comprising a cam lock received within a first orifice of a first component and a threaded fastener extending through a central axial cavity provided in the cam lock and received within a second orifice of a second component;
   wherein the cam lock induces a clamping load between the first and the second components normal to the axial cavity when rotated from a first to a second rotational position; and
   wherein the cam lock comprises a barrel portion having an interior diameter and an exterior diameter through which the central axial cavity extends, a distal end, and a proximal end, the proximal end comprising a cam surface proximate the exterior diameter of the barrel portion of the cam lock that engages an interior diameter of the first orifice of the first component and displaces the first component downwardly relative the second component when the cam lock is rotated from the first to the second rotational position.

2. The fastening device of claim 1, wherein the fastening device is installed on a modular composite seating assembly, the modular composite seating assembly comprising a pair of opposed seat track assemblies and a lower seat assembly having a seat pan, the seat pan having a pair of opposed side members, a one of each of the pair of opposed side members of the seat pan being in juxtaposed relation with a corresponding one of the pair of opposed seat track assemblies, wherein the one of the pair of opposed side members of the seat pan comprises the first component and the one of the pair of opposed seat track assemblies comprises the second component.

3. The fastening device of claim 2, wherein the one of the pair of opposed side members of the seat pan comprises a depending flange within which the first orifice is disposed.

4. The fastening device of claim 3, wherein the second orifice in the one of the pair of seat track assemblies comprises a threaded opening that receives a corresponding threaded end of the threaded fastener.

5. The fastening device of claim 1, wherein the first and second components are separated by a gap prior to assembly of the fastening device and wherein the first and second components are brought into abutting and clamped relation one with the other subsequent assembly of the fastening device and rotation of the cam lock from the first to the second rotational position.

6. The fastening device of claim 5, wherein a displacement of the first component downwardly when the cam lock is rotated from the first to the second rotational position equals or exceeds the gap prior to assembly of the fastening device.

7. The fastening device of claim 1, wherein the threaded fastener includes a threaded portion and a shoulder portion and the proximal end of the cam lock further comprises a drive head by which the cam lock can be rotated from the first to the second rotational position relative the threaded fastener when the shoulder portion of the threaded fastener is in abutting relation with the second component.

8. The fastening device of claim 7, wherein the drive head is a substantially hexagonal prism.

9. The fastening device of claim 7, wherein the proximal end of the cam lock includes a recess proximate an outer diameter of the drive head of the cam lock within which a locking tab is disposed and within which the locking tab of the cam lock can be displaced.

10. The fastening device of claim 1, wherein the first orifice comprises a key slot radially disposed along a lower portion of an interior diameter of the first orifice and the distal end of the cam lock comprises a key tab disposed outside and extending radially from a portion of an exterior diameter of the distal end which is received within the key slot during assembly of the fastening device.

11. The fastening device of claim 10, wherein the cam surface comprises a resilient locking tab disposed 180° opposite the key tab at a terminal portion of the cam surface, wherein the locking tab is displaced radially inwardly when the cam lock is rotated from the first to the second rotational position and the locking tab is urged into the key slot when the cam lock is in the second rotational position to thereby lock the locking tab in the second rotational position when the fastening device is assembled.

12. The fastening device of claim 11, wherein the cam surface and the locking tab extend axially toward the distal end of the cam lock beyond an inward surface of a drive head of the cam lock that abuts an outer surface of the first component when the fastening device is assembled.

13. The fastening device of claim 11, wherein the cam lock is comprised of a resilient material, whereby removal of the threaded fastener from the cam lock allows the cam lock to be removed from the first orifice of the first component to allow disassembly of the fastening device.

14. The fastening device of claim 13, wherein the cam lock is comprised of a polymeric material.

15. A fastening device for inducing a clamping load between a first component and a second component, the first component having a first face opposed to and proximate a second face of the second component, the fastening device comprising:
  a cam lock having a first rotational position and a second rotational position received within a first orifice in the first component, the cam lock comprising a cam surface and a locking tab at a terminal portion of the cam surface that engages an interior diameter of the first orifice of the first component and displaces the first component downwardly when the cam lock is rotated from the first to the second rotational position; and
  a threaded fastener received within a threaded second orifice in the second component, and extending through a central axial cavity provided in the cam lock;
  wherein the cam lock induces a clamping load between the first face of the first component and the second face of the second component in a direction normal to the axial cavity of the cam lock and the locking tab is urged into a key slot disposed within the interior diameter of the first orifice when the cam lock is in the second rotational position.

16. The fastening device of claim 15, wherein the fastener includes a threaded portion, a shoulder portion, and a drive head portion, and the cam lock further comprises a drive surface at a proximal end thereof by which the cam lock can be rotated from the first to the second rotational position relative the threaded fastener when the shoulder portion of the fastener is tightened against the second component.

17. The fastening device of claim 16, wherein the drive head portion of the threaded fastener comprises an internal drive and the drive surface of the proximal end of the cam lock comprises a substantially hexagonal prism.

18. The fastening device of claim 17, wherein the threaded fastener comprises a circular outer diameter drive head portion and the proximal end of the cam lock comprises a circular recess within which is fittingly received the drive head portion of the threaded fastener, whereby the cam lock may be rotated relative the threaded fastener.

19. A modular composite seating assembly conprising:
  a seat track assembly;
  a lower seat assembly having a lower seat pan, the lower seat pan having a side member, and wherein the side member of the lower seat pan is in juxtaposed relation with the seat track assembly; and
  a fastening device for inducing a clamping load between the seat track assembly and the lower seat pan, the fastening device comprising a cam lock having a first rotational position and a second rotational position received within a first orifice in the side member of the lower seat pan, the cam lock comprising a cam surface that engages an interior diameter of the first orifice of the side member of the lower seat pan and displaces the side member of the lower seat pan downwardly relative the seat track assembly when the cam lock is rotated from the first to the second rotational position, and a threaded fastener received within a threaded second orifice in the seat track assembly, and extending through a central axial cavity provided in the cam lock, wherein the cam lock induces the clamping load between the side member of the lower seat pan and the seat track assembly in a direction normal to the central axial cavity of the cam lock when the cam lock is in the second rotational position.

* * * * *